US007133866B2

(12) United States Patent
Rishel et al.

(10) Patent No.: US 7,133,866 B2
(45) Date of Patent: Nov. 7, 2006

(54) METHOD AND APPARATUS FOR MATCHING CUSTOMER SYMPTOMS WITH A DATABASE OF CONTENT SOLUTIONS

(75) Inventors: Kari Compton Rishel, Star, ID (US); William S. deMent, Eagle, ID (US); Paul E. Leclerc, Nampa, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 450 days.

(21) Appl. No.: 10/263,989

(22) Filed: Oct. 2, 2002

(65) Prior Publication Data

US 2004/0068497 A1 Apr. 8, 2004

(51) Int. Cl.
G06F 17/30 (2006.01)

(52) U.S. Cl. .................... 707/3; 707/4; 707/5
(58) Field of Classification Search ............... 707/3–5; 704/9
See application file for complete search history.

(56) References Cited

U.S. PATENT DOCUMENTS

| | | | |
|---|---|---|---|
| 5,224,206 A | 6/1993 | Simoudis | |
| 5,265,065 A * | 11/1993 | Turtle | 707/4 |
| 5,418,948 A | 5/1995 | Turtle | |
| 5,444,823 A | 8/1995 | Nguyen | |
| 5,794,237 A | 8/1998 | Gore, Jr. | |
| 5,895,466 A * | 4/1999 | Goldberg et al. | 707/5 |
| 5,956,711 A * | 9/1999 | Sullivan et al. | 707/5 |
| 6,081,774 A * | 6/2000 | de Hita et al. | 704/9 |
| 6,401,118 B1 * | 6/2002 | Thomas | 709/224 |
| 6,571,236 B1 * | 5/2003 | Ruppelt | 707/3 |
| 6,584,464 B1 * | 6/2003 | Warthen | 707/4 |
| 2003/0069880 A1 * | 4/2003 | Harrison et al. | 707/3 |

\* cited by examiner

Primary Examiner—Don Wong
Assistant Examiner—Cheryl Shechtman

(57) ABSTRACT

A method of forming a solution-based search query from a symptom-based search query for searching a solution-based document database is presented. A user query comprised of perceived symptom-based search terms is preprocessed to remove extraneous terms. The remaining search query is evaluated to identify symptom-based terminology. The symptom-based terminology is used to access a synonym database which matches the symptom-based search term with a solution-based search term. The solution-based search term is substituted into the original search term and the solution-based search query is entered into a search engine for identification of solution-based documents.

15 Claims, 6 Drawing Sheets

Example 1:

<meta name="doctitle" content="HP Inkjet Cartridge - Why a Cartridge Prints as if it were out of Ink When it Still Appears to Have Ink">

<meta name="user_task" content="fix problem">

<meta name="content_topic" content="component">

<meta name="main_component" content="change ink cartridge">

<meta name="hardware_categories" content="Solve a Problem">

Example 2:

<meta name="doctitle" content="HP Inkjet Cartridge - What to do if the colors you print don't match the colors on your screen">

<meta name="user_task" content="fix problem">

<meta name="content_topic" content="software">

<meta name="symptom" content+"output">

<meta name="symptom_details" content="color quality">

*FIG. 5*

METHOD AND APPARATUS FOR MATCHING CUSTOMER SYMPTOMS WITH A DATABASE OF CONTENT SOLUTIONS

BACKGROUND OF THE INVENTION

1. Field of the Invention

The present invention relates generally to document services and, more particularly, to a system and method of searching and identifying documentation in a database comprised of solution-oriented information accessible by a search engine.

2. State of the Art

Computer systems have become increasingly beneficial in their application as tools for solving customer support issues in a wide variety of technical disciplines ranging from computer and peripheral operational debugging to operational customer support. With the complex nature of technology and the proliferation of complex systems and applications, there exists a need for improving database access mechanisms and the accuracy of the results returned by those mechanisms.

Prior to computerized technology proliferation, technology consumers or customers could obtain service by contacting specially trained individuals at customer service desks where they could explain the specific abnormal behavior of their equipment. Customers would present their problems to the customer service agents by describing the symptoms or equipment behavior they were experiencing. These "symptom-based" problem descriptions were then noted by a customer service agent and entered into a search engine that accessed a database searching for possible solutions.

Technology databases were and continue to be predominantly populated with "solution-based" entries that describe to a user or customer "how-to" perform an operation or repair on their technology. The terminology utilized in a solution-based database includes language specific to performing a function or operation rather than the operational anomaly terminology describing the technology behavior that would be exhibited and therefore perceived by the user. It is appreciated that database searches are more exhaustive and comprehensive if the search query more precisely matches the terminology utilized in the targeted database.

As such, customer service agents, using their vast experience and specialty training, would act as the transforming entity for converting the symptom-based problem described by a customer into a solution-based query for presenting to the database search engine. While such a manual approach presented modest improvements, search results were inconsistent due to the human subjectivity factor and interpretive nature of the process.

Furthermore, due to the reality that the vast majority of customer service database information is written in solution-based format, translation by the customer service agent, while generally resulting in modestly more precise search results, exhibited further shortcomings and additional advances were desirable. For example, the economics associated with customer service agents as well as the substantial deployment of systems requiring customer service quickly became overwhelming and the resulting quality of translation from symptom-based customer inputs to solution-based database queries became unmanageable.

Additional advances have occurred which allow customers to directly input their customer service issue in electronic form for processing by a search engine in order to retrieve solutions to symptoms from the database. Unfortunately, customers present their issues to the search engine not only in the less compatible "symptom-based" form but also in "natural language" form which requires parsing of the words in order to extract the suitable search terms for inputting into a search engine. Natural language parsing is well known in the art and has met with marginal success when applied to a customer service application as they still engage in searching a database that is not based on the same syntax style or terminology of the input query.

The substantiality of the technological proliferation and the expanse of the customer base dictates that customers must directly access databases, such as customer service databases. Since customers are of diverse competencies and untrained to the nuances of the myriad of database syntaxes, as well as the fact that customer-generated queries are subject to the subjective stylization of the customer, an automated and mechanized approach is desirable.

BRIEF SUMMARY OF THE INVENTION

A method of forming a solution-based search query from a symptom-based search query is presented. Many user-entered queries are in response to user-perceived symptoms of a current activity. Such experiences may include operational anomalies with technical equipment, resulting in a user-perceived symptom as exhibited by the technology. Users, therefore, are inclined to formulate a search query based upon language or terms that describe symptoms of the behavior. In contrast, most technical documentation is formulated from a solution-based perspective, meaning a "how-to" or training paradigm.

The document searching system of the present invention facilitates the transformation of a symptom-based query, as presented by a user, into a solution-based query that results in the identification of a solution-based target document. Transformation is performed, in one example, using a synonym database. The synonym database includes symptom-based terms which correlate to a defined set of solution-based synonyms. A solution-based query results and the solution-based query is input into a search engine.

Exemplary steps of the method include identifying at least one symptom-based search term within the symptom-based search query, including identifying the presence of words, such as stop words, that are generally extraneous to the search at hand and removing those terms from the search term. The method further includes searching within a synonym database for a match of the symptom-based search term. Correlation of symptoms to solutions, in one embodiment of the present invention, is accomplished through the use of metadata as stored in a database. The synonym database includes solution-based synonyms which correspond to metadata associated with the solution-based documents of the solution-based document database.

Once the synonyms are identified, a solution-based search term is created by substitution of the solution-based terms into the search query. The query is then input into a search engine for retrieval of candidate documents from the solution-based document database that best correlate with the symptom-based query as input by the user.

BRIEF DESCRIPTION OF THE SEVERAL VIEWS OF THE DRAWINGS

In the drawings, which illustrate what is currently considered to be the best mode for carrying out the invention:

FIG. 5 is a diagram illustrating the correlation of metadata as associated with solution-based documents within a database, in accordance with an embodiment of the present invention.

DETAILED DESCRIPTION OF THE INVENTION

In the following detailed description of the preferred embodiments, reference is made to the accompanying drawings which form a part hereof and in which is shown, by way of illustration, specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
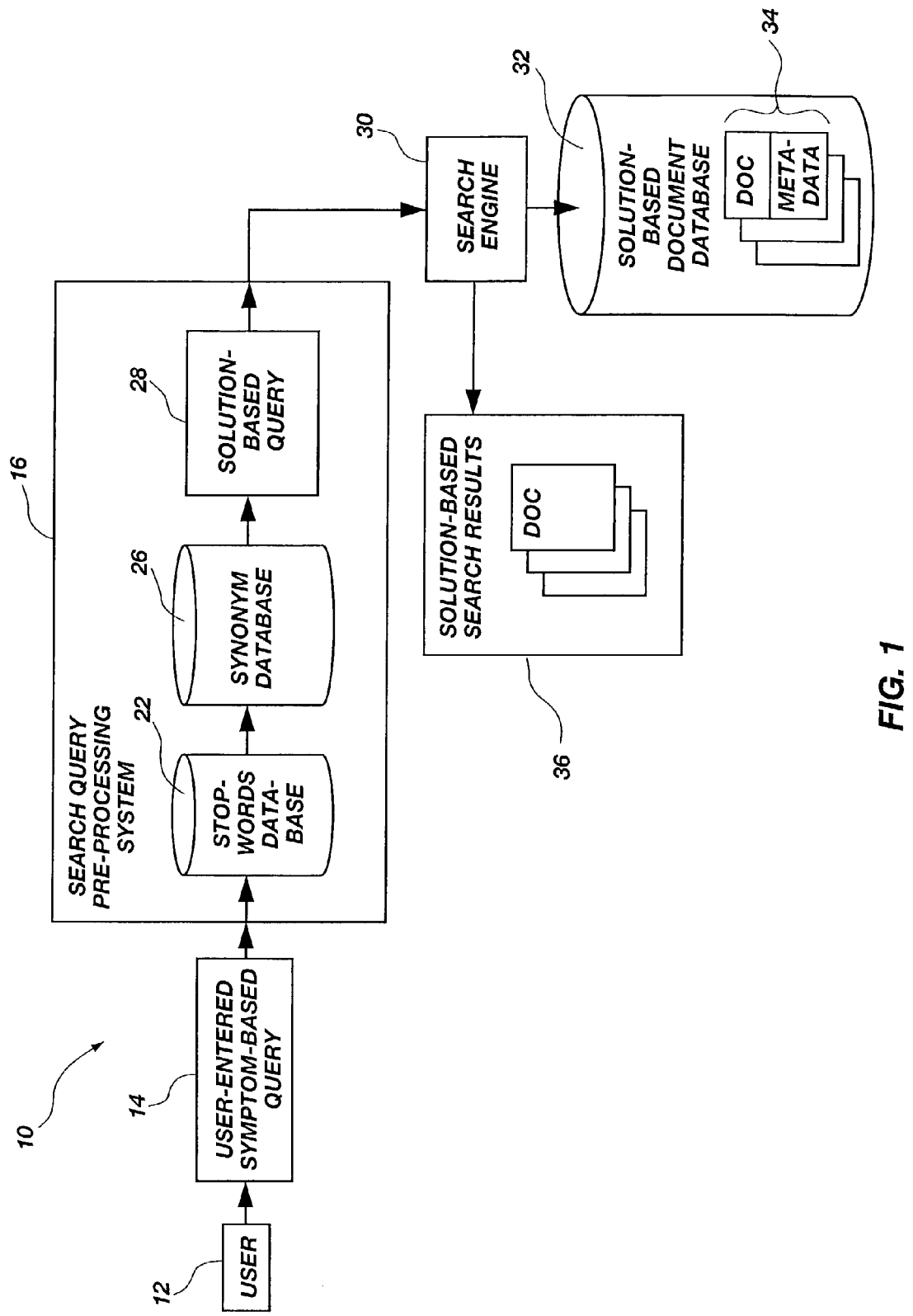
FIG. 1 is a block diagram illustrating one exemplary embodiment of a document searching system, according to the present invention.

A document searching system according to the present invention is illustrated generally as numeral 10 in FIG. 1. Document searching system 10 provides for the location or identification of documents as requested by a user. In FIG. 1, a user 12, preferably utilizing a data input device such as a computer, initiates a user-entered symptom-based query 14 which may consist of symptoms or perceived conditions experienced by a user in a particular environment such as in a computer or other automated system. One exemplary environment in which the present invention finds application is in the customer service or customer assistance environment for technology users. In such an environment, a user 12 may be experiencing anomalous behavior of some technological embodiment and utilize document searching system 10 for obtaining corrective information for attempting to remedy the perceived anomaly or symptom in question.

Document searching system 10, in order to facilitate the transformation of a symptom-based query 14 as proffered by user 12 into a syntax compatible with the solution-based documentation, further comprises a search query preprocessing system 16. Search query preprocessing system 16 performs a transformation between the symptom-based query as input by user 12 and a solution-based query as necessary for comparing and matching with solution-based information.

Figure 2:
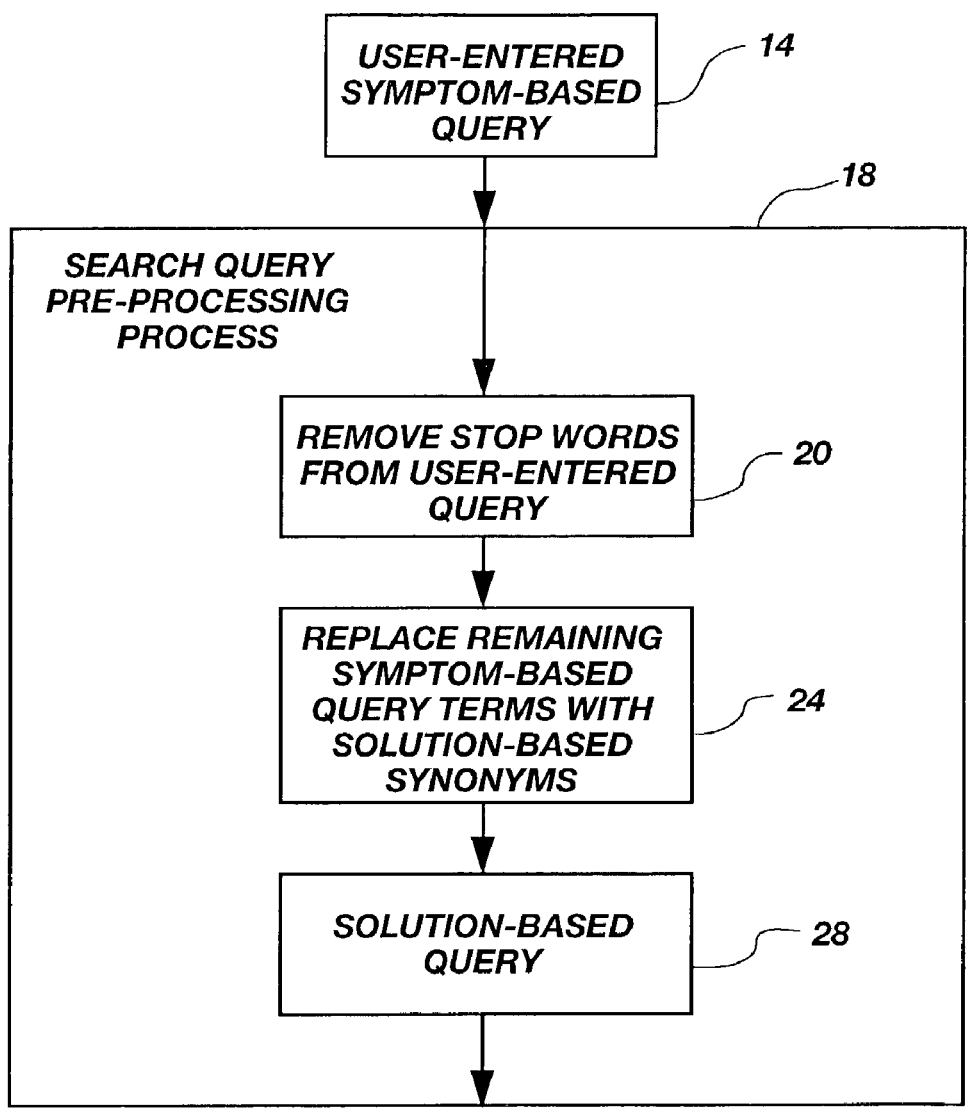
FIG. 2 is a flowchart illustrating processing of a user-entered query of a solution-based database, in accordance with the present invention.

FIG. 2 illustrates one of among other functions performed by search query preprocessing system 16. In FIG. 2, user-entered symptom-based query 14 undergoes a search query preprocessing process 18 in order to accomplish the query transformation described above. In search query preprocessing process 18, a subprocess or step 20 removes stop words from the user-entered symptom-based query 14. Those familiar with the art appreciate that stop words are those words that are so commonplace in a query as to render them non distinguishing or unable to distinguish between respective documents due to the common presence of such words.

One approach for removing such stop words is to parse the query into individual terms or words and compare each of those terms or words against known or identified stop words that are stored, for example, in a stop words database 22 (FIG. 1).

Once any and preferably all stop words have been removed from the user-entered query, a process or step 24 evaluates the remaining query terms and compares those terms which are symptom-based with a table or other database, such as synonym database 26 (FIG. 1). Synonym database 26 is comprised of symptom-based terms which correlate to a defined set of solution-based synonyms which are useful as search terms for accessing solution-based information. A solution-based query 28 results following the replacement of the symptom-based query terms with solution-based synonyms from the synonym database 26. The transformation between symptom-based search terms is complete and search query preprocessing system 16 (FIG. 1) forwards the solution-based search terms on to a search engine 30 (FIG. 1).

Search engine 30 interacts with a solution-based document database 32 which is comprised of solution-based documentation in the form of documents which preferably have metadata attached thereto, illustrated in FIG. 1 as documents 34. While the concept of metadata is generally known in the art, the present invention employs metadata having specific enumerated fields and which are comprised of document information or attributes which are used and desirable in the documentation identification environment. Search engine 30, upon comparing the solution-based search terms with documents 34 in database 32, returns solution-based search results 36, which may include a various number of documents either pointed to within database 32 or retrieved from database 32 for presentation to user 12.

Figure 3:
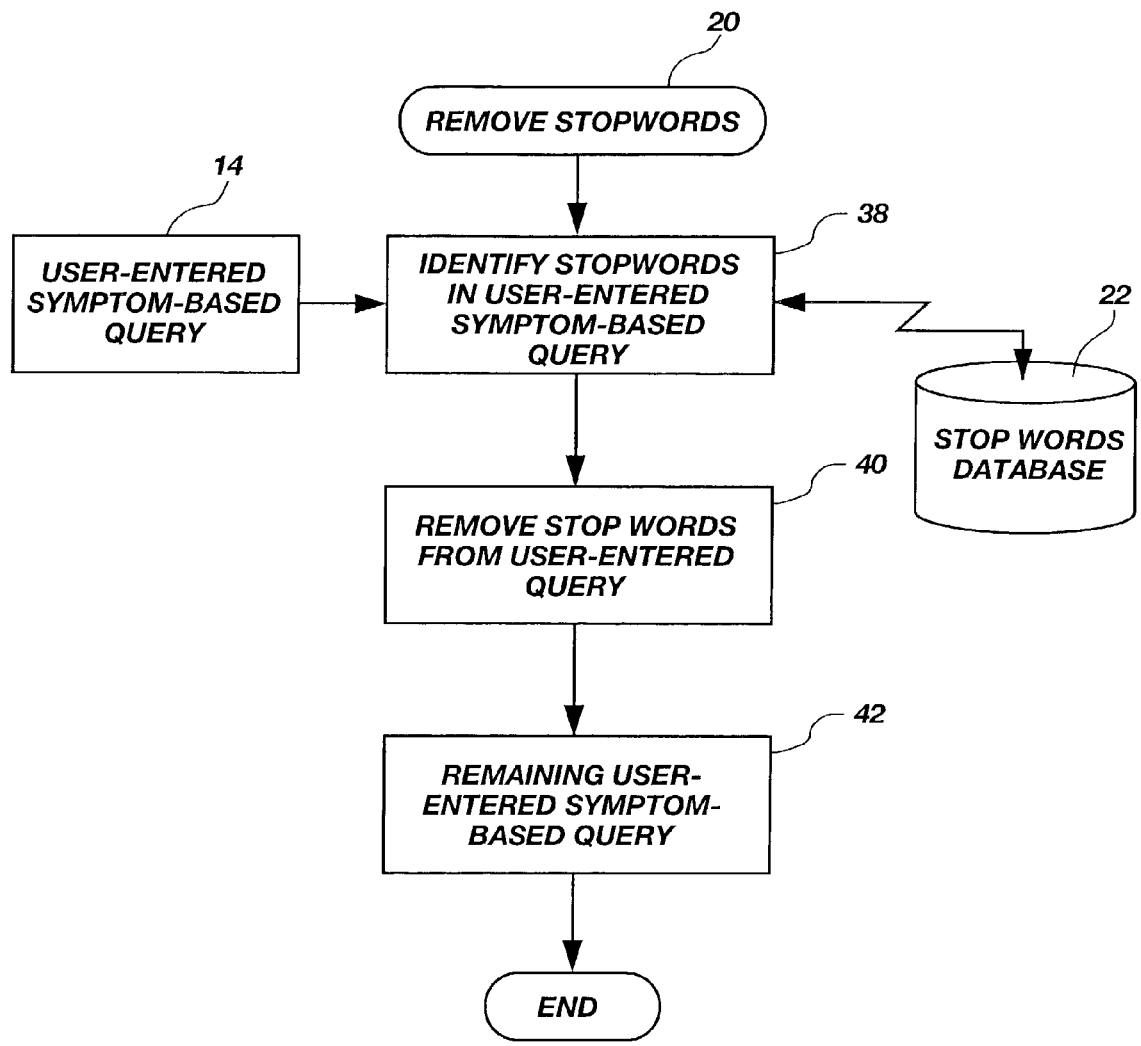
FIG. 3 is a detailed flowchart illustrating an aspect of preprocessing of a user-entered query including the removal of stop words from a user-entered query, in accordance with an embodiment of the present invention.

FIG. 3 illustrates a more detailed operation of removing stop words process 20 as introduced previously in FIGS. 1 and 2. In FIG. 3, remove stop words process 20 is comprised of a series of steps, one of which is step 38 which receives a user-entered symptom-based query 14 as an input upon which to parse and compare terms from stop words database 22. Upon the identification of the presence or existence of any stop words, a step 40 removes the stop words from the user-entered query, resulting in a remaining user-entered symptom-based query 42.

Figure 4:
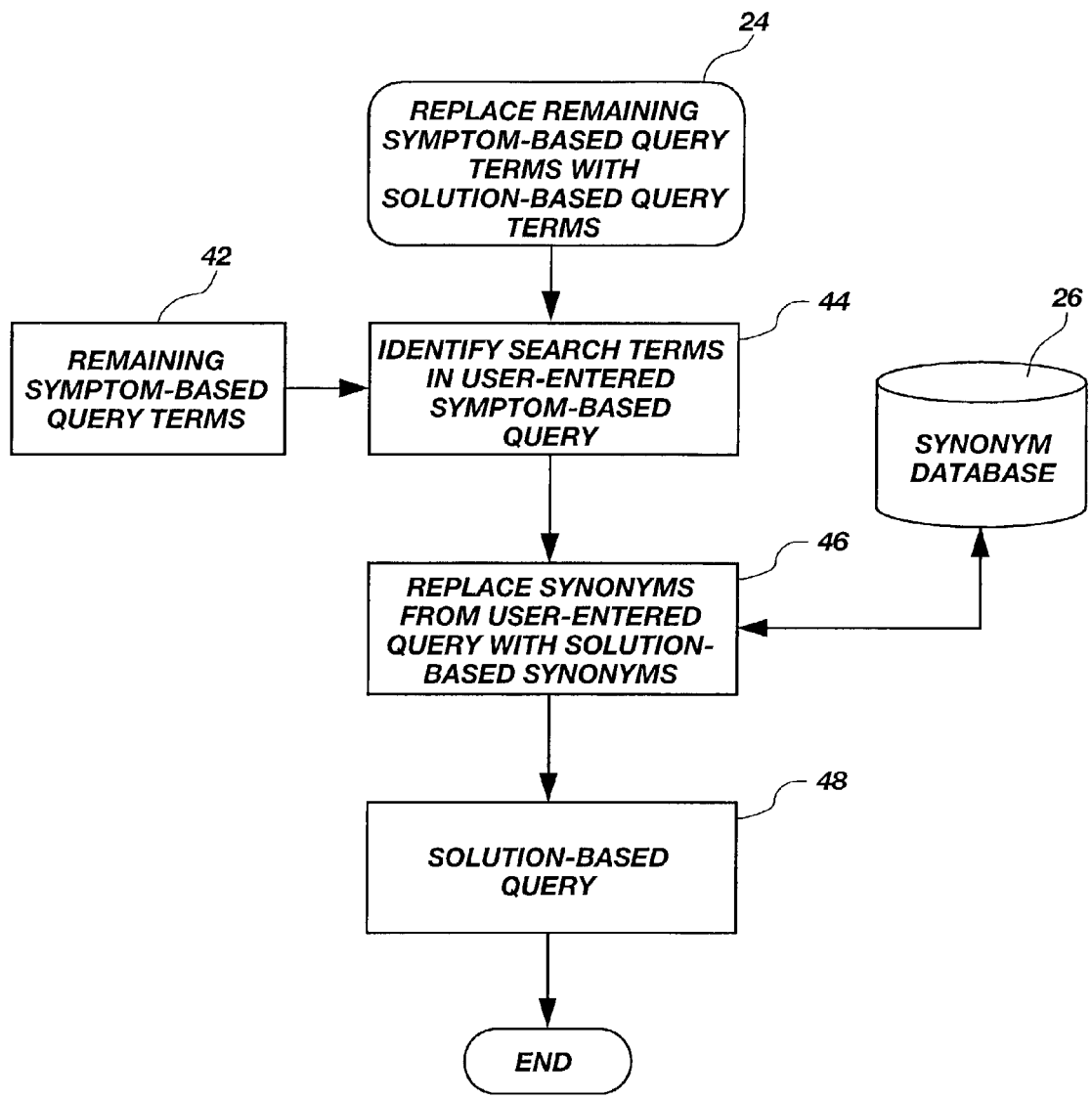
FIG. 4 is a detailed flowchart illustrating solution-based synonym replacement of search terms within a search query, in accordance with an embodiment of the present invention.

FIG. 4 is a more detailed illustration depicting replacement of symptom-based query terms with solution-based synonyms of step 24 as first introduced in FIG. 2. In FIG. 4, process 24, receiving as an input the remaining symptom-based query terms 42 in a step 44, identifies from among the remaining terms the search terms from the user-entered symptom-based query. Once the search terms have been identified, a step 46 interacts with synonym database 26 to identify and replace synonyms from the user-entered query with solution-based synonyms resulting in a solution-based query 48.

The values for the metadata attributes are preferably fed into synonym database 26 to form the basis of the database. The transformation process is meaningful when the synonym database and metadata attributes share the same terms. Once the synonym database contains these metadata values, a synonym for each metadata value can be assigned. Synonyms for metadata values may be updated independently from the source of the metadata values and, preferably, are done so upon an evaluation of respective matching analysis, resulting in alteration and addition of synonyms for metadata values.

FIG. 5 illustrates an example of representative metadata including the associated attributes of an exemplary document. In FIG. 5, individual "metatags," or document attributes, describe characteristics of the associated document that exist outside or independent of the document. Such attributes present information about the document in a consistent and meaningful fashion. In this particular embodiment of the invention, the metadata is incorporated within the document. A logical alternative could entail keeping the metadata separate from the document. It is known in the art that search engines can search both a document's content and a document's metadata. In addition, a search engine can rate a match made within the document's metadata more highly than a document's content. In the example, the metadata includes solution-based terms (e.g., <meta name="main_component" content="change ink cartridge">). Because a user's query has been transformed from symptom-based terms to solution-based terms, a transformed query containing "ink cartridge" will have a greater potential of matching with this document. Metadata values, in this example, enhance the content of the document and thus are more likely to match users' queries and provide relevant solutions.

Figure 6:
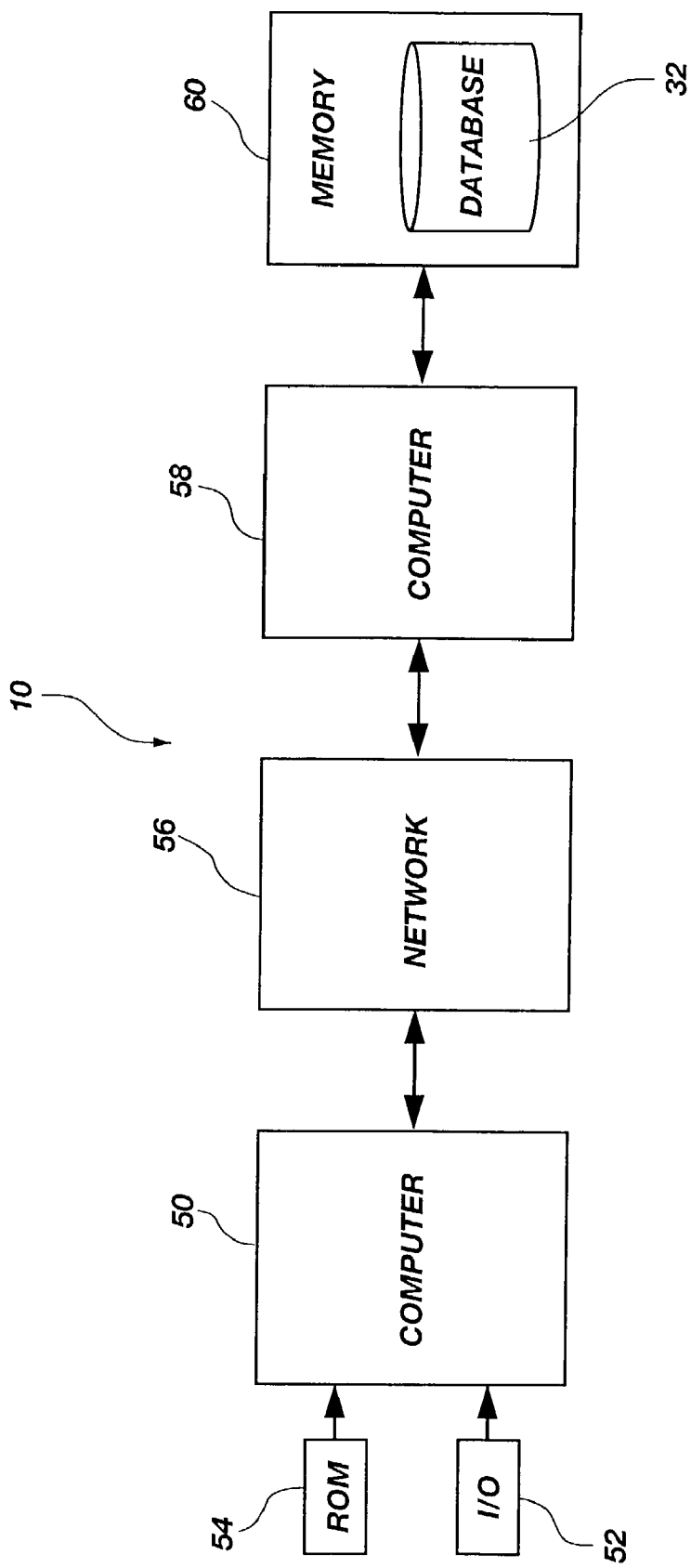
FIG. 6 is a block diagram of components within which the embodiments of the present invention may operationally interact.

FIG. 6 illustrates a document searching system 10 which includes a host system 50 which may execute the search query preprocessing process 18 (FIG. 2) for facilitating the transformation from a user-entered symptom-based query 14 into a solution-based query 28 (both of FIG. 1). Host system 50 may be included in a computer server or other microprocessor-based system capable of performing a sequence of logic operations and includes hardware, software, firmware, or a combination of these. In one exemplary embodiment, host system 50 receives a search query from an input device 52 for processing according to the methods and steps described herein. Processing databases associated with the preprocessing implementations of the present invention, such as stop words database 22 and synonym database 26, may be included in some form of memory device 54, which for illustrative purposes only, is depicted as a form of read-only memory.

Host system 50 may further communicate with the newly transformed solution-based query across a network 56 or other connection device to a second host system 58 which is capable of facilitating the operation of search engine 30 (FIG. 1). Second host system 58 is further interconnected with a memory device such as memory 60 which includes databases such as solution-based document database 32.

What is claimed is:

1. A method of using a solution-based search query formed from a symptom-based search query for searching a solution-based document database, comprising:

identifying at least one symptom-based search term within said symptom-based search query, said symptom-based search query identifying at least one of a perceived condition and an anomalous behavior of a technical environment;

searching within a synonym database for a match to said at least one symptom-based search term, said synonym database comprised of symptom-based terms correlating to solution-based synonyms and said solution-based synonyms corresponding to metatags associated with solution-based documents of said solution-based document database;

replacing said at least one symptom-based search term of said symptom-based search query with at least one solution-based synonym corresponding to said metatags of at least one of said solution-based documents to form said solution-based search query; and searching said solution-based document database with said solution-based search query, at least one of said solution-based documents of said solution-based document database providing corrective information for said at least one of said perceived condition and said anomalous behavior of said technical environment.

2. The method as recited in claim 1, wherein said searching step further comprises:

comparing in said synonym database said at least one symptom-based search term to a corresponding one of said solution-based synonyms, said one of said solution-based synonyms from among a group of identified symptom attributes within said metatags.

3. The method as recited in claim 1, further comprising the step of removing stop words from said symptom-based search query.

4. The method as recited in claim 3, wherein said removing stop words step comprises the steps of:

parsing each word of said symptom-based search query into individual search words; and for each of said individual search words:

comparing said individual search words against a stop word database; and deleting said individual search words from said symptom-based search query that appear in said stop word database.

5. The method as recited in claim 1, wherein said solution-based document database is a customer service database.

6. A method of searching a document database, comprising:

entering a symptom-based search query for searching a solution-based document database, said symptom-based search query describing a perceived condition or anomalous behavior of technical equipment;

identifying at least one symptom-based search term within said symptom-based search query;

firstly, searching for a match to said at least one symptom-based search term within a synonym database comprised of symptom-based terms correlating to solution-based synonyms, said solution-based synonyms corresponding to metatags associated with solution-based documents of said solution-based document database;

replacing said at least one symptom-based search term of said symptom-based search query with at least one solution-based synonym corresponding to said metatags of at least one of said solution-based documents to form a solution-based search query; and secondly, searching said solution-based document database using said solution-based search query, at least one of said solution-based documents of said solution-based document database providing information for remedying said perceived condition or anomalous behavior of said technical equipment.

7. The method as recited in claim 6, wherein said searching for a match step further comprises:

comparing in said synonym database said at least one symptom-based search term for a corresponding one of said solution-based synonyms, said one of said solution-based synonyms from among a group of identified symptom attributes within said metatags.

8. The method as recited in claim 7, wherein said searching said solution-based document database step further comprises favorably weighting matches of said solution-based documents that are identified using said solution-based search query.

9. The method as recited in claim 6, further comprising the step of removing stop words from said symptom-based search query.

10. The method as recited in claim 9, wherein said removing stop words step comprises the steps of:
   parsing each word of said symptom-based search query into individual search words; and for each of said individual search words:
      comparing said individual search words against a stop word database; and
      deleting said individual search words from said symptom-based search query that appear in said stop word database.

11. The method as recited in claim 6, wherein said solution-based document database is a customer service database.

12. A method of accessing a solution-based document database having solution-based documents therein, comprising the steps of:
   correspondingly associating symptom attributes to said solution-based documents in said solution-based document database, said solution-based documents providing corrective information for perceived conditions and anomalous behaviors of technical environments;
   creating a synonym database comprised of solution-based synonyms which correlate said symptom attributes with at least one symptom-based search term;
   entering a symptom-based search query for searching said solution-based document database, said symptom-based search query identifying at least one of a perceived condition and an anomalous behavior of a technical environment;
   identifying at least one symptom-based search term within said symptom-based search query;
   searching for a match to said at least one symptom-based search term within said synonym database comprised of symptom-based terms correlating to solution-based synonyms, said solution-based synonyms corresponding to metatags associated with said solution-based documents of said solution-based document database; and
   replacing said at least one symptom-based search term of said symptom-based search query with at least one solution-based synonym corresponding to said Metatags of at least one of said solution-based documents to form a solution-based search query.

13. The method as recited in claim 12 wherein said correspondingly associating step comprises the steps of:
   defining a group of symptom attributes which identifies symptoms that may be addressed by said solution-based document database;
   identifying at least one symptom attribute for each of said solution-based documents in said solution-based database document; and
   associating said at least one symptom attribute with a corresponding one of said at least one solution-based document.

14. The method as recited in claim 12, further comprising the step of removing stop words from said symptom-based search query.

15. The method as recited in claim 14, wherein said removing stop words step comprises the steps of:
   parsing each word of said symptom-based search query into individual search words; and for each of said individual search words:
      comparing said individual search words against a stop word database; and
      deleting said individual search words from said symptom-based search query that appear in said stop word database.

* * * * *

UNITED STATES PATENT AND TRADEMARK OFFICE
CERTIFICATE OF CORRECTION

PATENT NO. : 7,133,866 B2
APPLICATION NO. : 10/263989
DATED : November 7, 2006
INVENTOR(S) : Kari Compton Rishel et al.

It is certified that error appears in the above-identified patent and that said Letters Patent is hereby corrected as shown below:

In column 8, lines 9-10, in Claim 12, delete "Metatags" and insert -- metatags --, therefor.

Signed and Sealed this

Fifth Day of May, 2009

JOHN DOLL
*Acting Director of the United States Patent and Trademark Office*